Patented Mar. 20, 1945

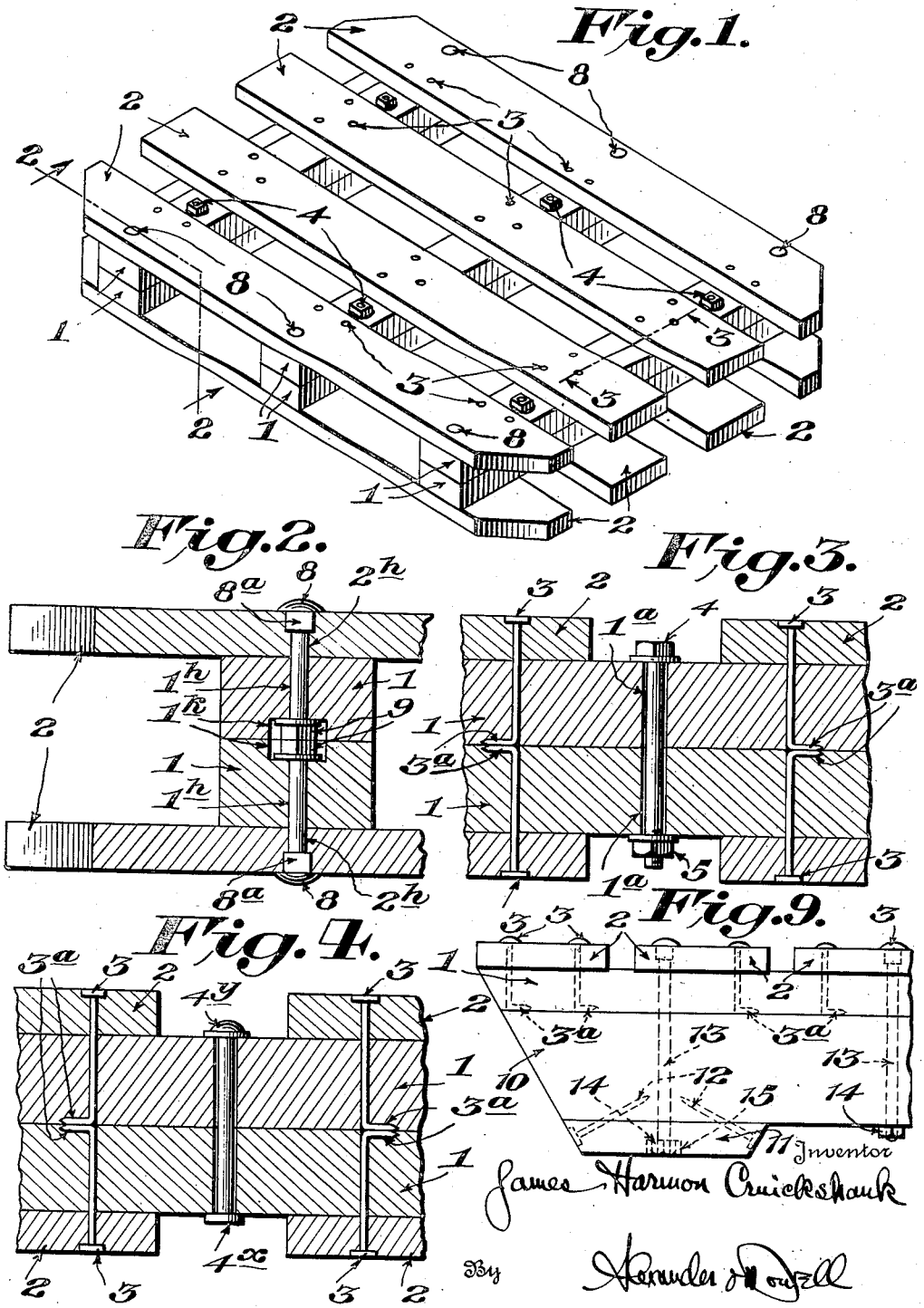

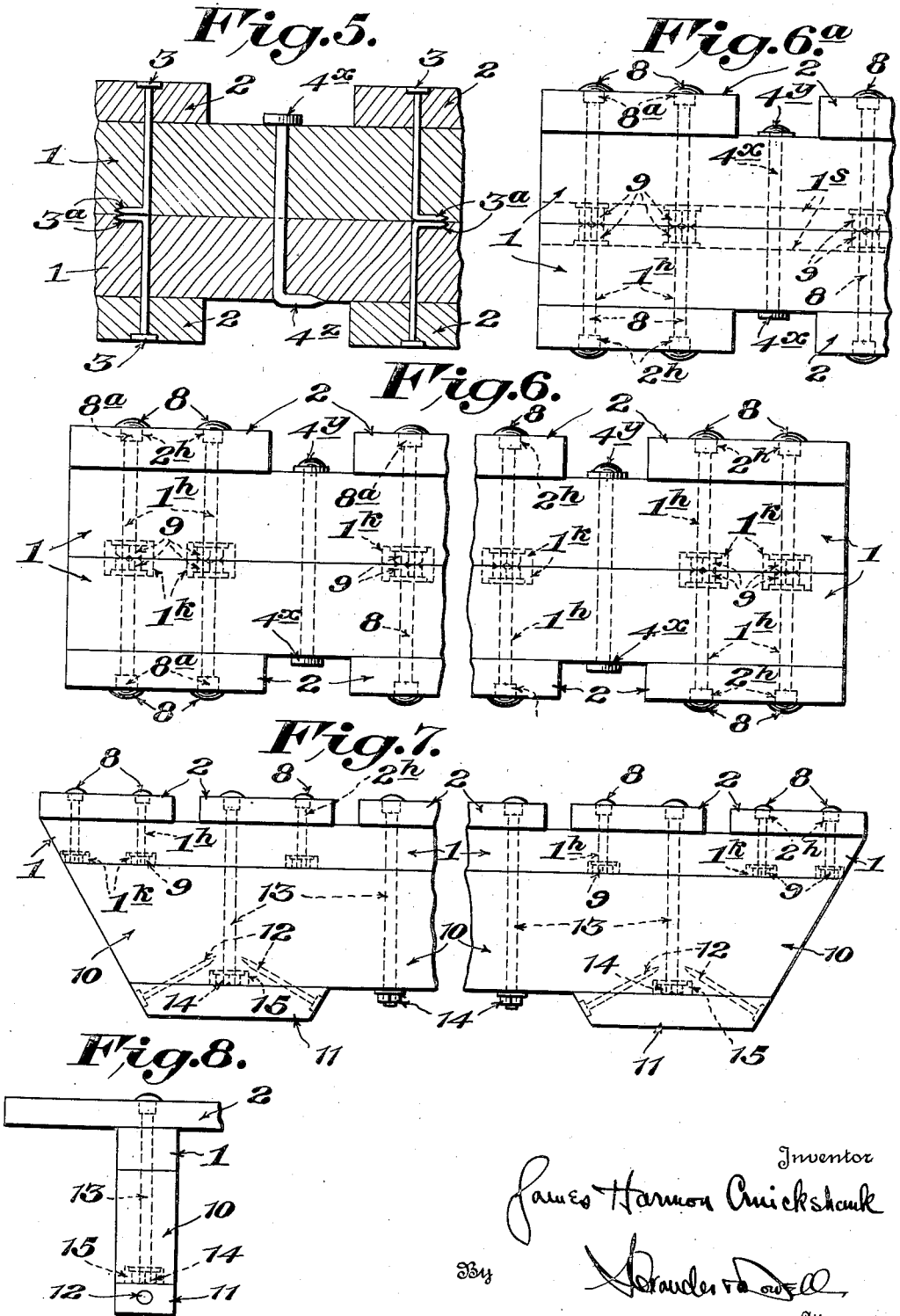

2,371,878

UNITED STATES PATENT OFFICE 2,371,878

BOLTED PALLET AND SKID PLATFORM

James Harmon Cruickshank, Big Indian, N. Y., assignor of thirty-five per cent to Florence Baxter Cruickshank, five per cent to James Harmon Cruickshank, Junior, five per cent to John Emmett Cruickshank, five per cent to Robert William Cruickshank, and fifteen per cent to Alice Carol Cruickshank, all of Big Indian, N. Y.

Application August 4, 1942, Serial No. 453,580

2 Claims. (Cl. 248—120)

This invention is a novel improvement in pallets and skid platforms adapted to be used for handling and storing packaged goods in warehouses, or the like, in connection with lift trucks, said pallets receiving and retaining the loads when stored and being unusually superimposed in tiers, each pallet resting directly upon the load carried by the underlying pallet or platform.

The present invention is an improvement upon the platform dsclosed in my copending application, Serial No. 429,307, filed February 2, 1942, (now Patent No. 2,297,347), which disclosed two-faced pallets consisting of two superimposed sections secured together to form a unitary pallet, each section comprising spaced cleat members connected together by cross-boards secured to the cleat members by means of nails driven through the boards and cleat members and clinched, the sections thus formed being then superimposed in opposed relation and the cleat members of the sections secured together by means of spike rods riveted at each end over the faces of the cleat members or by means of clinched nails, or bolts, or other means.

The principal object of my present invention is to provide an improved sectional pallet or skid platform of the above type having bolts similar to ordinary carriage bolts adjacent each end of the cross-boards of each section, said bolts having flattened heads exposed at the outer faces of the cross-boards, and having non-circular shank portions engaging the holes for the bolts through the cross-boards to prevent the bolts from turning, the opposite or threaded ends of the bolts terminating in nut receiving recesses in the inner faces of the related cleat members, whereby the opposed sections may be readily superimposed without interference by the bolts and nuts, and the two sections then secured together in the manner set forth in my aforesaid application and above described; said arrangement of the carriage bolts preventing any material weakening of the pallets, since the flat heads of the bolts are exposed without countersinking on the outer faces of the cross-boards, which are usually about 1½" thick, and since the nut receiving recesses in the cleats need be only about ⅜" in depth, while the cleat members themselves are usually about 2" x 4" in cross-section, thus leaving 1⅝" of solid wood under the nuts in the cleat members, the same being ⅛" more than the thickness of cross-boards themselves. Also the use of carriage bolts with square shanks under the heads prevents the bolts from turning, and as the nuts are disposed in opposed contacting relation in recesses or slots in the adjacent cleat members, the nuts themselves cannot rotate or become loosened and drop off during usage of the pallets, whereas if the nuts were exposed in recesses or slots at outer faces of the pallet or skid platform cleats, as is often the case in present day pallets and platforms, the nuts would be able to rotate and loosen or drop off, thereby rendering the pallets or platforms useless.

A further object of the invention is to provide a modified pallet or skid platform in which all the clinched nails shown in my aforesaid application, for holding the cross-boards on the cleat members of the sections, may be entirely replaced by carriage bolts in the manner above described, said bolts each having nuts disposed in recesses or slots in the contacting inner faces of the cleat or runner members.

A still further object of the invention is to provide a skid platform in which the cleats or runners are formed in sections, and the cross-boards are secured to the upper sections by clinched nails, or clinched nails and carriage bolts, or by carriage bolts alone having nuts disposed in recesses or slots in the undersides of the upper sections; certain of said carriage bolts being replaced by longer carriage bolts extending through the cross-boards and through the upper and lower cleat or runner sections of the skid platforms, said long bolts having nuts disposed in recesses or slots in the under sides of the lower cleat or runner sections; and said lower cleat or runner sections having wear blocks adjacent their ends.

Other minor objects of the invention will be hereinafter set forth.

I will explain the invention with reference to the accompanying drawings which illustrate several practical embodiments thereof, to enable others familiar with the art to adopt and use the same; and will summarize in the claims, the novel features of construction, and novel combinations of parts, for which protection is desired.

In said drawings:

Fig. 1 is an enlarged perspective view of one form of my novel pallet.

Fig. 2 is an enlarged section on the line 2—2, Fig. 1.

Fig. 3 is an enlarged section on the line 3—3, Fig. 1.

Fig. 4 is a section similar to Fig. 3 but showing the use of riveted spikes in place of bolts for holding the cleat sections together.

Fig. 5 is a section similar to Fig. 3 but showing the use of clinched nails instead of bolts or riveted spikes for holding the cleat sections together.

Fig. 6 is a side elevation of a modified pallet using an all-bolt arrangement for holding the cross-boards to the cleat members of the sections.

Fig. 6a is a fragmentary side elevation of a modified pallet similar to Fig. 6, but showing the use of continuous slots instead of separate recesses in the cleats for receiving the nuts of the bolts.

Fig. 7 is a side elevation of a skid platform embodying my sectional cleat or runner feature, utilizing carriage bolts for receiving the cross-boards to the related cleat members, also for holding the cleat and runner members together.

Fig. 8 is an end elevation of one of the cleats and runners of the skid platform shown in Fig. 7.

Fig. 9 is a fragmentary side elevation similar to Fig. 7, but showing the use of clinched nails for holding the cross-boards and cleat members of the skid platform together, instead of carriage bolts.

The pallets shown in Fig. 1 with their superimposed loads are usually handled and stacked in tiers by means of lifting trucks having vertically movable lifting fingers which are inserted into openings between the upper and lower faces at the sides of the pallets, the pallets with their superimposed loads being placed upon or removed from the load on the underlying pallet, the loads remaining upon the pallets when in stacked relation.

In my copending application, Serial No. 429,307, (now Patent No. 2,297,347), I disclosed a pallet made of two opposed similar sections, generally similar to that shown in Figs. 1-5 inclusive herein, each section comprising parallel spaced cleat members 1 of depth only one-half the required spacing between cross-boards, on opposite faces of the pallet, necessary to receive the lifting fingers of the lift truck. Disposed across the cleats 1 of each pallet section were cross-boards 2 secured to the cleat members 1 by two (or more) standard nails 3 having their lower ends clinched, as at 3a (Figs. 3, 4 and 5) and the two pallet sections are then superimposed in opposed relation and secured together by various means of bolts 4 carrying nuts 5 (Fig. 3); or by means of heavy nails or spikes 4x having riveted heads 4y (Fig. 4); or by means of long spikes or nails 4x whose ends are clinched over as at 4z (Fig. 5) or by other means.

My present invention provides for further increased strength in the pallets by arranging bolts at the ends of the cleat members 1 passing through the cleat members 1 and cross-boards 2 in such manner as to avoid weakening of the pallets.

As shown in Figs. 1 and 2, the outermost cross-boards 2 of each cleat section are provided with holes 2h adapted to receive carriage bolts 8 having flattened heads overlying the outer faces of the boards 2 in such manner as to avoid injury to the loads carried thereon. The shank of each bolt 8 has a non-circular shank portion 8a adjacent the head snugly fitting a correspondingly shaped portion in the hole 2h in the board. Each bolt 8 also extends through a bore 1h in the related cleat member 1 and terminates within nut receiving recesses 1k in the related cleat member 1 and terminates within nut receiving recesses 1k in the lower face of its related cleat member 1, a nut 9 being threaded upon the end of the bolt 8 and being disposed within said recess 1k.

The recesses 1k for nuts 9 need only be approximately ⅜" in depth, thus leaving a 1⅝" thickness of solid wood between the nuts 9 and the under surfaces of the cross-boards 2, which depth may be ⅜" more than the thickness of the cross-boards 2 themselves which would ordinarily not exceed 1½". Thus the above arrangement of bolts 8 not only avoids weakening of the cleats due to the countersinking or formation of the recesses 1k, but the use of the flat headed carriage bolts greatly increases the strength of the pallets by preventing separation of the cross-boards 2 at the ends of the cleat members 1 adjacent the openings in the pallets which receive the lifting fingers of the lift trucks. Furthermore, the use of carriage bolts 8 with non-circular shanks 8a adjacent their heads, prevents the bolts from turning in the pallets; and as the nuts 9 are housed in recesses 1k in the contacting faces of the cleat members, said nuts 9 cannot become loosened, whereas if the nuts were exposed in recesses 9 at outer faces of the cleats 1, the nuts might readily work loose and fall off. While the recesses 1k in the opposed cleats 1 may, if desired, be disposed opposite each other so that nuts 9 would be disposed in contacting relation, the recesses are preferably staggered so that any accidental protrusion of the bolts or nuts due to thinness of the members 1 or 2 will be absorbed in the wooden face of the opposite cleat.

Instead of using separate recesses 1k for each nut 9, slots 1s (Fig. 6a) may be provided in the contacting faces of the cleat members 1 of the pallet sections extending inwardly from each end thereof the desired distance, which slots would serve the same purpose without detracting from the strength of the pallet.

As shown in Figs. 1 and 2, the bolts 8 each replace clinched nails 3 at the ends of the cleat members 1. In some instances however it may be desirable to utilize carriage bolts 8 in place of all the clinched nails 3, and Figs. 6 and 6a show end views of such modified construction. In Figs. 6 and 6a all of the clinched nails 3 are dispensed with, and in place thereof two (or more) carriage bolts 8 are provided connecting each of the cross-boards 2 to their related cleat members 1 in the same manner as above described and shown in Fig. 2, the nuts 9 (Fig. 6) being disposed in recesses 1k in the contacting faces of the cleat members 1 as above described, the opposed nuts 9, 9, being in contacting relation as shown; or the opposed nuts 9, 9 (Fig. 6a) being disposed in opposed continuous slots 1s and in opposed contacting relation, said slots extending the full lengths of the cleat members 1, said slots 1s saving the labor involved in forming separate recesses 1k for each bolt 9. In event the bolts 9 are staggered in the cross-boards, the slots 1s may be as wide as the width of the cleat will permit without sacrificing unnecessary strength; thus if the cleat is 2" wide the slot may readily be 1" in width, and if the cleat is 4" wide the slot may be 3" in width. The means for holding the superimposed sections together may be the same as those disclosed in Figs. 3, 4, 5, or disclosed in my aforesaid application Serial No. 429,307.

The all-bolted pallet shown in Figs. 6 and 6a provides a substantial saving in cost over that of the present-day all-bolted pallet which ordinarily utilizes about twenty bolts of ½" diameter and about 6¾" long to hold the cross-boards and unsectionalized 4" x 4" cleats together, and which are so constructed that the nuts on the ends of the bolts must be countersunk in exposed faces of the cross-boards, thus weakening the cross-boards even when the cross-boards are 1⅝"

in thickness. Moreover, the relatively large bolts used in such present day pallets are expensive, costing approximately eighty cents for each pallet. In my all-bolted pallet, using inverted bolts, the cross-boards need only be about 1 3/16" in thickness, and forty carriage bolts of 5/16" diameter and 3" in length, plus six bolts of 3/8" diameter and 4" in length to hold the sections together need be used, the same costing about fifty cents. Moreover, in my pallet only about forty-eight and one-half feet of lumber is needed, as against eighty feet used in the present-day all-bolted pallet, and the boring for the bolt holes may be done by a multiple boring machine so that this extra cost is negligible; also the nuts may be tightened by machine.

In Figs. 7 and 8 a novel skid platform is illustrated embodying the above described features in that the cross-boards 2 of the upper section are secured to the upper cleat members 1 by means of carriage bolts 8 having heads exposed upon the outer faces of the cross-boards 1, and nuts 9 disposed in recesses 1k (or slots 1s) in the lower faces of the cleat members 1, the bolts 8 passing through bores 2h in the cross-boards and bores 1h in the cleat member 1 in the same manner as above stated in connection with Figs. 1 and 2, the nuts 9 contacting the adjacent faces of the underlying runner members 10 which close the recesses 1k (or slots 1s) in the cleat members 1. Runner members 10 are disposed below each cleat member 1 and carry replaceable shoes 11 having beveled ends and disposed on the undersides of the runners 10, said shoes being secured to the runners 10 by spikes or nails 12 driven through the beveled ends of the shoes and entering the runners 10 at an angle thereto as shown in Fig. 7, so that the heads of the spikes 12 will not be exposed at the bottom faces of the shoes 11. In order to secure the cleat members 1 and runners 10 together, certain of the bolts 8 are replaced by long bolts 13, preferably carriage bolts, extending down through the cross-boards 2, through the cleats 1 and through the runners 10 as shown in Figs. 7 and 8, bolts 13 having nuts 14 on their lower ends, the nuts 14 in way of the shoes 11 being housed in recesses 15 formed in the underside of the runners 10 of such depth that the nuts 14 will contact the shoes 11 to keep the nuts from turning on the bolts. Thus in event a runner section 10 or cleat section 1 should become broken or worn, the same may be readily replaced by removing nuts 14 without having to discard the other section, thereby permitting a material saving in upkeep of the skid platforms.

In Fig. 9 a modification of the skid platform is illustrated in which each of the carriage bolts 8 (Fig. 7) is replaced by a clinched nail 3 similar in all respects to those shown in Figs. 3, 4 and 5, the ends of the nails 3 being clinched as at 3a under the cleat members 1; otherwise the skid platform is the same as shown and described with respect to Figs. 7 and 8, the long bolts 13 extending through the cross-boards 2, cleat members 1, and runners 10, and carrying nuts 14; and the runners 10 being provided with shoes 11 secured by spikes 12.

I do not limit my invention to the exact forms shown in the drawings, for obviously changes may be made therein within the scope of the claims.

I claim:

1. A pallet comprising opposed superimposed sections; each section comprising spaced parallel cleats, cross-boards connecting said cleats, and bolts having shanks of substantially the same length as the combined thickness of the boards and cleats passing therethrough, said bolts having flattened heads overlying the outer faces of the cross-boards, and said bolts carrying nuts disposed in recesses in the contacting faces of the cleats; and means connecting the cleats of the superimposed sections together.

2. In a pallet as set forth in claim 1, said recesses comprising continuous slots in the cleats, and the nuts in each slot contacting the face of the opposed cleat.

JAMES HARMON CRUICKSHANK.